Nov. 14, 1967     E. J. PELOCHINO     3,351,966
METHOD OF MAKING RESILIENT LOCKING FASTENERS
Filed Oct. 20, 1965
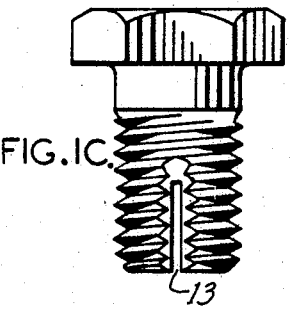
FIG. 1C.
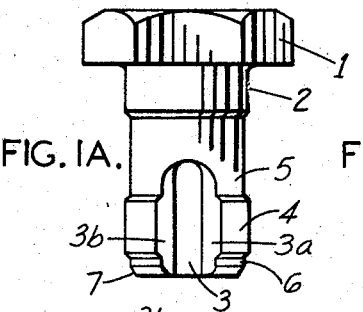
FIG. 1A.
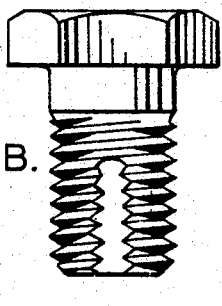
FIG. 1B.
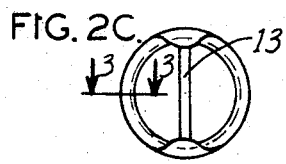
FIG. 2C.     FIG. 2A.     FIG. 2B.
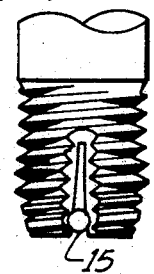
FIG. 10.
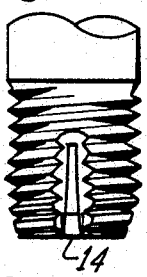
FIG. 8.
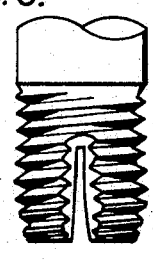
FIG. 6.
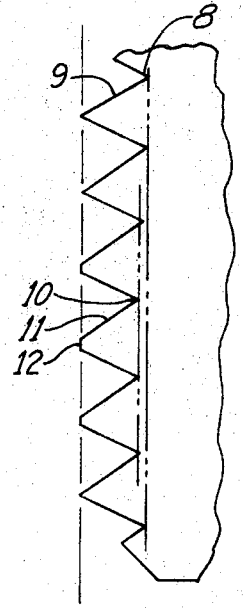
FIG. 3.
FIG. 11.     FIG. 9.     FIG. 7.
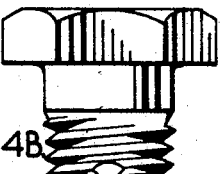
FIG. 4B.
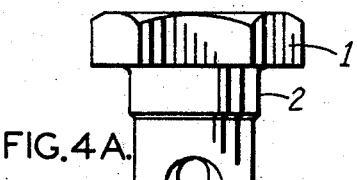
FIG. 4A.
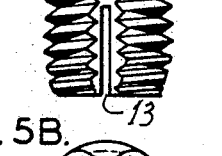
FIG. 5B.
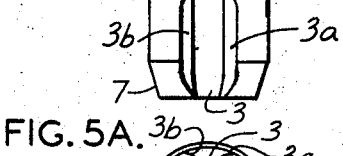
FIG. 5A.
INVENTOR.
EDWARD J. PELOCHINO 3,351,966
METHOD OF MAKING RESILIENT
LOCKING FASTENERS
Edward J. Pelochino, 716 S. Burris St.,
Compton, Calif. 90221
Filed Oct. 20, 1965, Ser. No. 506,425
5 Claims. (Cl. 10—10)

ABSTRACT OF THE DISCLOSURE

The method of making resilient locking fasteners by forming an unthreaded screw blank successively with a pair of diametrically opposed grooves and a thread in the grooved region of the blank and then longitudinally slotting the blank along the grooves to provide resilient locking segments.

---

The present invention relates to resilient locking fasteners having flexible or deformable body sections and more particularly to a novel method of making such fasteners.

The invention involves a locking screw fastener having resilient or flexible body or stem sections provided with threads of a slightly larger diameter in the region of the resilient or flexible sections, whereby upon driving of the fastener into a female threaded member to effect a strong, resilient locking action, such locking action being maintained notwithstanding conditions of extremely high temperatures and super-sonic vibration as encountered in modern-day high speed or super-sonic speed jet powered aircraft, rockets and the like.

One of the most critical needs has been for a self-locking threaded bolt that can withstand the temperatures present in rocket motors, jet engines and afterburners. Existing self-locking bolt designs using organic insert locking devices are ineffective at temperatures exceeding 390° F. Moreover, they rely on friction or drag load to prevent release through rotation. Although commercially acceptable, aircraft design allowable cannot afford the previous latitude given to older type fasteners using this principle. Cross sectional areas are unevenly reduced, creating unfavorable bending stresses as verified by lower fatigue resistance. Over the full range of aircraft requirements, other devices using lockwashers, wire inserts, etc., have attendant functional limitations.

The present invention fulfills this need and in addition provides a fastener which is reusable, this being a highly desirable and important characteristic difficult of accomplishment where heat is encountered, even prior to the advent of jet and rocket motors.

The present invention involves and has as an object the provision of an improved resilient locking fastener of the type referred to above, the fastener hereof being constructed according to the method hereof so as to facilitate the entry of the enlarged thread region into the female threaded recess.

I have discovered certain advantageous procedures for manufacturing the present fastener, and, hence, the present invention involves and has for an object the provision of a novel method of making the improved fastener whereby to accomplish the desired ease of entry of the fastener, while at the same time the method provides a simple yet effective mode for producing the fastener.

In the illustrative embodiment of the fastener hereof the resilient locking fastener includes resilient cantilevered locking segments formed by providing at least one radially disposed longitudinally extended slot in the screw stem. The resilient sections have an enlarged thread located in the region of the slot so as to cause deformation of the flexible or resilient stem sections upon insertion or driving of the fastener. My present invention has as a further and more specific object, providing the fastener with a relief or negative rake angle so as to eliminate the tapping or thread cutting tendency of the threads traversed by the slot, at least at the leading edge of the interrupted threads and preferably at both the leading and the trailing edges.

As is apparent from the foregoing, the invention contemplates among its objectives, the provision of a method of making resilient locking fasteners as referred to in the preceding paragraph. In this regard, I provide a method of forming the threads on the resilient locking sections of the screw fastener in such a manner that the tapping or thread cutting tendency of the interrupted thread is eliminated. Hence, the resultant fastener in accordance with the invention has superior ability to withstand loosening responsive to vibration and even under high temperature conditions. Moreover, the fastener may be re-used many times without enlarging the female threaded recess and without otherwise losing its locking efficiency.

More specifically, it is an object of the invention to provide a method of making such screw fasteners by rolling a screw blank, wherein the blank at a stage preliminary to rolling of the threads is provided with a chordal recess extending longitudinally of the blank, of a depth slightly greater than the minimum root diameter of the thread form of the fastener, and having at least the side wall thereof which forms the advancing face or leading edge of the thread disposed at a wide angle to a transverse plane through the stem medially of the side walls of the slot, such angle preferably being greater than 45° and potentially being greater than 90°, but being herein shown as about 60°. Subsequent rolling of a thread on the stem with consequent flow of the blank material into the chordal recess does not create cutting edges on the interrupted thread faces according to the instant method, and therefore, the article of manufacture of the present invention has superior holding ability as referred to above. Preferably, a similar chordal recess is formed at the side of the slot forming the trailing edge of the interrupted thread so that thread cutting does not occur upon removal of the fastener, as a result of which the fastener may be reapplied to the same threaded opening a number of times.

Other objects and advantages of the invention will be hereinafter described or will become apparent to those skilled in the art, and the novel features of the invention will be defined in the appended claims.

In the accompanying drawings:

FIG. 1a is a side elevation of a screw blank prepared for the rolling of threads thereon;

FIG. 1b is a view similar to FIG. 1a, showing threads rolled on said blank;

FIG. 1c is a view in side elevation, showing the finished screw, following slotting of the threaded blank of FIG. 1b;

FIG. 2a is an end elevation of the blank of FIG. 1a;

FIG. 2b is an end elevation of the threaded blank of FIG. 1b;

FIG. 2c is an end elevation of the finished screw of FIG. 1c;

FIG. 3 is an enlarged fragmentary sectional view as taken on the line 3—3 of FIG. 2c;

FIG. 4a is a side elevation of a modified screw blank;

FIG. 4b is a view corresponding to FIG. 4a, showing the blank following the rolling of threads thereon and the slotting of the stem;

FIG. 5a is an end elevation of the blank of FIG. 4a;

FIG. 5b is an end elevation of the threaded and slotted blank;

FIG. 6 is a fragmentary side elevation of the threaded and slotted blank of FIG. 4b, illustrating the locking segments spread apart to cause thread interference upon insertion of the fastener;

FIG. 7 is an end elevation of the fastener of FIG. 6;

FIG. 8 is a fragmentary view similar to FIG. 6 but illustrating an end plug in the end of the fastener;

FIG. 9 is an end elevation of the fastener of FIG. 8;

FIG. 10 is a further fragmentary view similar to FIG. 6, illustrating a transverse pin in the slotted end of the fastener; and FIG. 11 is an end elevation of the fastener of FIG. 10.

Like reference characters in the several views of the drawing and in the following description designate corresponding parts.

Referring to FIGS. 1a through 3, this form of the fastener is preferably constructed in accordance with the following method. First, as seen in FIG. 1a, a screw blank is provided having an appropriate head 1, and a stem 2. This blank is preferably formed in a header machine so that the stem is cylindrical but has diametrically opposite elongated grooves 3, 3, which are of a depth less than the minimum root diameter of the ultimate thread form to be formed on the blank.

The grooves 3, it will be noted with particular reference to FIG. 2a, are substantially chordal recesses the side walls of which are disposed at a substantial angle to a transverse plane extending longitudinally through the stem. Assuming that the fastener will have a right hand thread, the side wall 3a of the grooves will ultimately constitute the leading faces of the slots during right-hand rotation, and the side walls 3b of the grooves will constitute the trailing faces. For a reason which will hereinafter more fully appear, the leading faces 3a, at least, are formed at a wider angle adjacent the outer zone thereof than at the base of the faces 3a.

The general angle of the faces 3a and 3b of grooves 3 is illustrated as on the order of about 60° to the aforementioned transverse plane; preferably this angle should be greater than 45° and may exceed 90° if desired. It is the purpose in forming these faces 3a and 3b that at least the leading edge 3a will have a negative angle of rake at the advancing thread edge in the finished fastener. Preferably, both of the faces 3a and 3b of each groove are formed and disposed at such angle so that the rolling of threads thereon will not produce a cutting leading edge on the thread which would act as a tap.

In this embodiment it is proposed that there be a number of threads in the region of the grooves 3, which threads have an enlarged pitch diameter as compared with the other threads. Therefore, I form the stem 2 with an enlarged section 4 on which threads having one pitch diameter are to be formed, and a stem section 5 on which threads of a lesser pitch diameter are to be formed. In addition, the stem 2 has formed thereon a pilot section 6 of the same diameter as the section 5, this pilot section preferably terminating in a bevelled edge 7. The just described stem form is preferably accomplished by grinding.

Subsequently, the formed blank as heretofore described, and as shown in FIGS. 1a and 2a, is provided with a thread, preferably by rolling the stem between rolling dies, as is well known in the art, but the dies having provisions for rolling a thread which is best seen in FIG. 3, has regular root and pitch diameter, as at 8 and 9, in the small diameter region 5 of the stem 2, but which has slightly larger root and pitch diameters, as at 10 and 11, in the larger diameter region 4 of the stem 2, the enlarged thread being preferably truncated at its crest 12.

As seen in FIG. 1b the rolling of threads on the stem 2 causes the displacement of a portion of the stem material into the grooves 3 at the faces 3a and 3b, so that the general inclination of the groove walls 3a and 3b in the blank of FIG. 1a should be selected so that the resultant interrupted thread edge does not have a cutting action, but instead has a negative angle of rake so as to assure that the enlarged pitch diameter threads will not tap the female recess.

Finally, the threaded blank of FIG. 1b is slotted at 13 as shown in FIG. 1c, longitudinally on a plane extending transversely between the grooves 3. Since the grooves 3, as previously pointed out, extend radially inwardly to a depth greater than the root of the threads, no burrs are left as a result of slotting which might otherwise interfere with driving of the screw. Entry of the screw is further facilitated by the reduced or tapered pilot end of the stem.

The fastener described above, it will now be recognized, has a pair of cantilevered segments which are resilient and may be deflected inwardly due to the oversize thread on the cantilevered segments, but no cutting action of the leading or trailing edges of the interrupted threads will occur, and the fastener may therefore be reutilized numerous times in the same hole.

Since no enlargement of the female thread occurs, the fastener hereof has a dependable locking action which is capable of enduring super-sonic vibrations and extremely high temperatures. Such fasteners constructed of A-286 and M-252 alloys have been successfully tested at 1200° F., and 1600° F., respectively, without loss of locking effectiveness.

In the embodiment of the invention shown in FIGS. 4a through 5b the details are generally similar to those heretofore described, so that the same reference characters are applied. In lieu of forming the blank stem 2 with an enlarged section as at 4 in the previous embodiment, a thread of uniform pitch diameter is rolled on the stem prior to slotting. As in the previous embodiment this thread will have no cutting effect at the leading edge, that is at the faces 3a of slots 3.

In order to provide a locking action the cantilevered sections are permanently spread apart, as shown in FIGS. 6 and 7. It will be noted in this connection that in FIG. 6 the slot 13 diverges outwardly as compared with the parallel sided slot of FIG. 4b.

In FIGS. 8 and 9, an end plug 14 is disposed in the slot 13 to hold the cantilevered locking sections in a spread condition. The end plug limits inward deflection of the tapered pilot end of the fastener, but the slot inwardly of the plug enables resilient deformation of the resilient locking sections.

In FIGS. 10 and 11 a transverse pin 15 is employed to hold the segments in the spread position much in the same manner as the end plug 14.

Preferably, in the use of the present fastener a coating of suitable corrosion resistant and lubricating material is applied to the fastener. Such coating material may be silver, radium cadmium, platinum, nickel, and others, as may be found necessary under different conditions of temperature and material combination.

While the specific details of the preferred method of making the present fastener as well as a number of embodiments of fasteners so made have been herein shown and described, changes and alterations may be resorted to without departing from the spirit of the invention as defined in the appended claims.

I claim:

1. The method of making a locking screw fastener having resilient locking segments, comprising: forming in an unthreaded screw blank, a pair of diametrically opposed grooves extending longitudinally of the blank, with at least one side wall of the grooves being disposed at a substantial angle to a plane extending longitudinally of the blank and extending through said grooves, then displacing the blank material to form threads on said stem interrupted by said grooves, said side wall of said grooves providing the end of the thread with a negative angle of rake, and then slotting said threaded blank lengthwise along said grooves to provide said resilient locking segments.

2. The method of claim 1, including the steps of, forming said thread on said blank in the region of said grooves with a pitch diameter greater than the thread on the remainder of said blank.

3. The method of claim 1 including, expanding said locking segments so that said interrupted thread has an enlarged diameter.

4. The method of claim 1, including the steps of forming said thread on said blank in the region of said grooves with a pitch diameter greater than the thread on the remainder of said blank, and truncating said thread of greater pitch diameter so that the thread throughout the length of the blank is of substantially the same crest diameter.

5. The method of claim 1, including forming said grooves with their side walls disposed at angles greater than 45° relative to said plane.

References Cited
UNITED STATES PATENTS

| | | | |
|---|---|---|---|
| 278,230 | 5/1883 | Fairlamb | 151—14 |
| 2,266,758 | 12/1941 | Holtz | 151—22 X |
| 2,407,160 | 9/1946 | Kahn | 151—14 |

WILLIAM W. DYER, JR., *Primary Examiner.*
LEONIDAS VLACHOS, *Examiner.*